United States Patent [19]
Duran et al.

[11] Patent Number: 6,012,555
[45] Date of Patent: Jan. 11, 2000

[54] WHEELCHAIR BRAKING SYSTEM

[76] Inventors: Ignacio Duran; Diego A. Duran, both of 1718 Deer Path, San Antonio, Tex. 78232

[21] Appl. No.: 09/060,025

[22] Filed: Apr. 14, 1998

[51] Int. Cl.[7] .............................. B60T 1/00; F16D 65/14
[52] U.S. Cl. ...................... 188/2 F; 188/109; 280/304.1
[58] Field of Search ................................. 188/2 F, 82.9, 188/19, 109, 69, 31; 280/304.1, 242.1, 250.1, 273

[56] References Cited

U.S. PATENT DOCUMENTS

| | | | |
|---|---|---|---|
| 3,302,757 | 2/1967 | Eagleson, Jr. | 188/2 F |
| 4,320,818 | 3/1982 | Knoche | 188/2 F |
| 4,623,043 | 11/1986 | Babilas | 188/2 |
| 4,733,755 | 3/1988 | Manning | 188/2 |
| 4,852,697 | 8/1989 | Kulik | 188/2 F |
| 5,203,433 | 4/1993 | Dugas | 188/2 |
| 5,358,266 | 10/1994 | Roth et al. | 280/304.1 |
| 5,379,866 | 1/1995 | Pearce et al. | 188/2 |
| 5,894,912 | 4/1999 | Dobben | 188/2 F |

FOREIGN PATENT DOCUMENTS

| 693 792 | 4/1930 | France | 188/109 |
|---|---|---|---|

*Primary Examiner*—Robert J. Oberleitner
*Assistant Examiner*—Jeffrey Woller
*Attorney, Agent, or Firm*—Goldstein & Canino

[57] ABSTRACT

A wheelchair braking system, for use on a wheelchair having a frame and a pair of wheels, comprising an axle assembly attached to one of the wheels. The axle assembly is supported within a block assembly. The axle assembly has a locking gear comprising a plurality of gear teeth. The block assembly is mounted within a housing and is capable of controlled vertical motion within the housing. The housing is rigidly mounted to the frame. A main spring is located between the housing and block, such that weight upon the wheelchair compresses the main spring and allows the block to move upward within the housing. A foremast assembly having a foremast body is mounted to the housing such that when the block is lowered sufficiently within the housing, the foremast body engages the gear teeth and stops the gear from rotating. Thus, when weight upon the wheelchair is reduced when a passenger gets up from the wheelchair, the block moves downward within the housing, bringing the foremast body into contact with the locking gear, and braking the wheels. A manual release lever extends rearward from the housing so that a person standing behind the wheelchair can selectively operate the manual release lever to free the foremast from the locking gear and allow the wheels to rotate.

14 Claims, 5 Drawing Sheets

WHEELCHAIR BRAKING SYSTEM

BACKGROUND OF THE INVENTION

The invention relates to a wheelchair braking system. More particularly, the invention relates to a system for automatically preventing the wheels of a wheelchair from moving when the passenger is not fully seated in the wheelchair, thus preventing the wheelchair from moving suddenly while the passenger is in the process of sitting down or getting up from the wheelchair.

Standard wheelchairs have two large wheels which are attached on the sides of the wheelchair. These wheels are typically mounted in a manner which maximizes freedom of movement, to facilitate low effort mobility for the passenger seated in the wheelchair. However, having freely moving wheels is not always advantageous. When the passenger is getting up from the wheelchair, or sitting down, it is highly desirable that the wheelchair provide some degree of "sure footing" for the passenger. The passenger relies on the wheelchair to balance themselves while getting up and sitting down.

Frequently, the wheelchair does not provide the needed balance, but instead rolls backward just as the passenger shifts their weight toward the wheelchair. Thus, the end result is typically a fall. The fall can cause severe injury, especially if the passenger hits their head on the chair on the way down. Often the passenger is using the wheelchair because of an injury. Thus, a fall therefrom can aggravate existing injuries, prevent them from healing correctly, or even cause new injuries.

To prevent such mishaps, some wheelchairs have a manual brake provided. U.S. Pat. No. 5,379,866 to Pearce et al. discloses a light-weight wheel assembly and static brake for wheelchairs. This manual brake allows the passenger to lock the wheels before sitting down or getting up from the wheelchair. However, the manual brake is only effective in preventing injury if the passenger remembers to set it. Further, many people who use wheelchairs suffer from diminished mental capacity. These people often forget to set the brake, and then fall when they try to get up from the wheelchair.

U.S. Pat. No. 5,358,266 to Roth et al. discloses a wheelchair electric brake and pedal safety kit. A wheelchair braking system is disclosed which has an electric switch mounted within the seat for sensing the weight of the passenger, and a brake that is operated thereby. Unfortunately, the device in Roth is electrically operated. Thus, it requires that the user maintain a charged battery power source in order for the brake to continue to operate properly.

U.S. Pat. No. 5,203,433 discloses an automatic braking wheelchair, which employs an arm that is directly linked between the seat and the wheel, for locking the wheel when the passenger rises from the seat. U.S. Pat. Nos. 4,733,755 to Manning and 4,623,043 to Babilas both disclose devices which seek to automatically lock the wheels when the passenger is exiting the wheelchair.

While these units may be suitable for the particular purpose employed, or for general use, they would not be as suitable for the purposes of the present invention as disclosed hereafter.

SUMMARY OF THE INVENTION

It is an object of the invention to produce a wheelchair braking system which automatically locks one or more wheels of a wheelchair, to prevent the wheelchair from rolling when a passenger is sitting down or getting up from the wheelchair. Accordingly a braking mechanism is provided which responds to weight upon the wheelchair from the passenger, and will lock the wheel when the relative weight upon the wheelchair seat indicates that the passenger is not fully seated.

It is another object of the invention to produce a wheelchair braking system which adapts onto any standard wheelchair. Accordingly a system is provided which is easily attachable by simply mounting the brake housings to the frame and replacing the existing wheel and axle.

It is yet another object of the invention to provide a wheelchair braking system which is constructed for reliability, and requires only minimal maintenance. Accordingly, a fully mechanical system is provided which does not require batteries or any other source of electrical power to operate.

It is a further object of the invention to provide a wheelchair braking system which engages to stop movement of the wheels, and then leaves very little "play" within the wheels, so that once the locking system is engaged the wheels are only capable of moving a few inches forward or backward. Accordingly, braking is accomplished by engaging a foremast between the teeth of a gear. Depending on the number of teeth in the gear, play can be easily minimized to approximately ten degrees.

It is a still further object of the invention that the brake can be manually disengaged by a person helping the passenger. Accordingly, a release lever is provided, which extends rearward from the braking housing, so that a person behind the wheelchair can easily release the brake when they are holding the chair for a person sitting down or getting up from the wheelchair.

The invention is a wheelchair braking system, for use on a wheelchair having a frame and a pair of wheels, comprising an axle assembly attached to one of the wheels. The axle assembly is supported within a block assembly. The axle assembly has a locking gear comprising a plurality of gear teeth. The block assembly is mounted within a housing and is capable of controlled vertical motion within the housing. The housing is rigidly mounted to the frame. A main spring is located between the housing and block, such that weight upon the wheelchair compresses the main spring and allows the block to move upward within the housing. A foremast assembly having a foremast body is mounted to the housing such that when the block is lowered sufficiently within the housing, the foremast body engages the gear teeth and stops the gear from rotating. Thus, when weight upon the wheelchair is reduced when a passenger gets up from the wheelchair, the block moves downward within the housing, bringing the foremast body into contact with the locking gear, and braking the wheels. A manual release lever extends rearward from the housing so that a person standing behind the wheelchair can selectively operate the manual release lever to free the foremast from the locking gear and allow the wheels to rotate.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
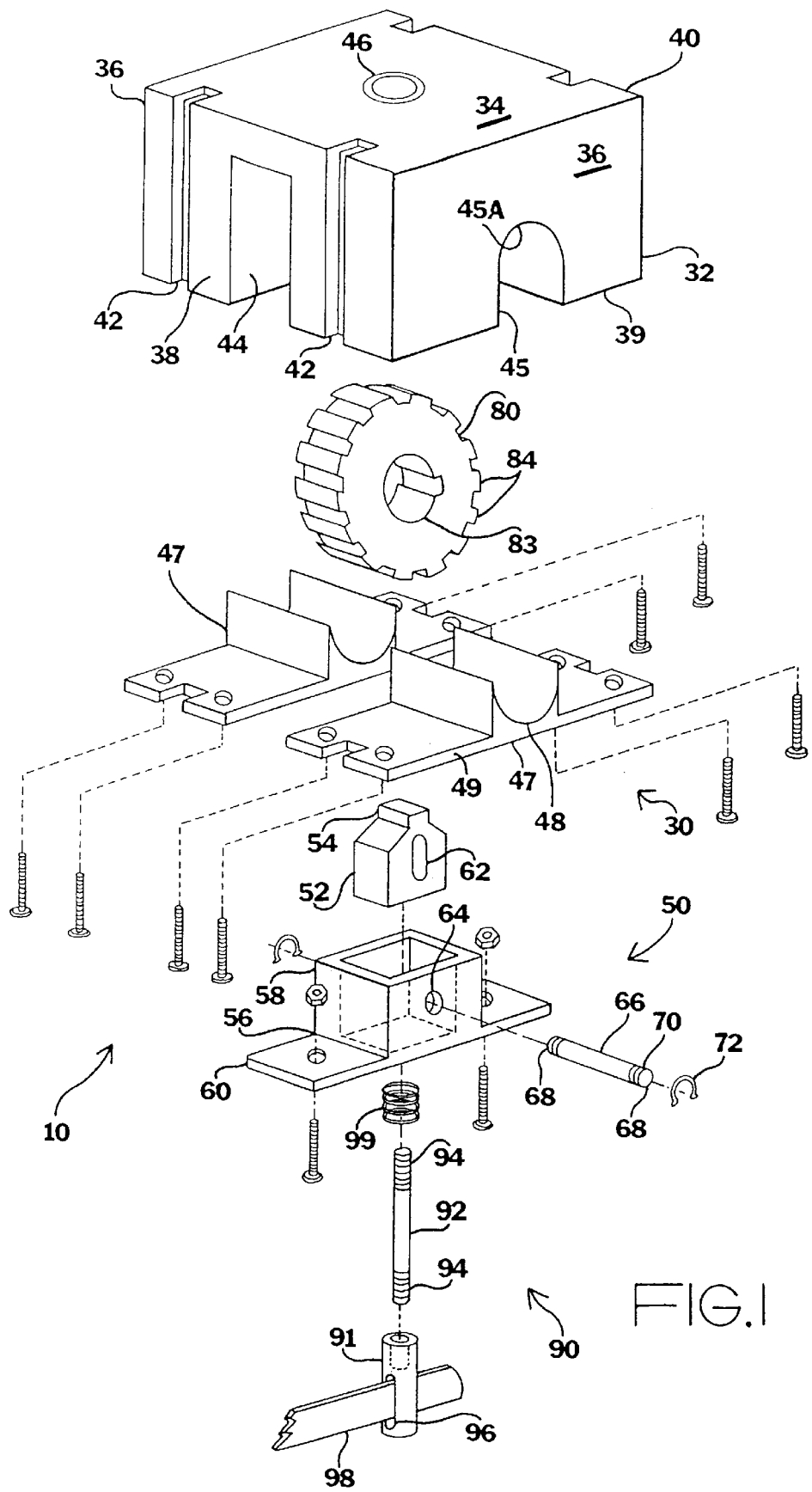
FIG. 1 is a diagrammatic assembly view, illustrating various components of the block assembly, foremast assembly, release mechanism, and the locking gear.

FIG. 1 illustrates a braking system 10, comprising a block assembly 30 and a foremast assembly 50.

The block assembly 30 comprises a block 32, having a block top 34, block sides 36, a block front 38, a block bottom 39, and a block rear 40. The block 32 has vertical grooves 42 in the block front 38 and block rear 40, extending between the block top 34 and block bottom 39. The block has a gear cavity 44 extending from the block bottom 39, between the block front 38 and block rear 40. The block also has an axle way 45 extending upward from the block bottom 39, between the block sides 36. The axle way 45 has an arcuate top 45A. The block has a spring seat 46 in the block top 34.

The block assembly 30 further comprises a pair of bridges 47. Each bridge 47 has a semicircular bearing support 48, and a bridge flange 49. The bridge flange 49 mounts to the block bottom 39, such that the bearing supports 48 extend into the axle way 45 and form a cylindrical passage with the arcuate top 45A.

A locking gear 80 is illustrated between the bridges 47. The locking gear 80 is positioned in the assembled braking system 10 between the bridges 47 in the gear cavity 44. The gear has a shaftway 83, and has a plurality of teeth 84. When the locking gear is in its assembled position, the shaftway 83 is coaxial with the cylindrical passage formed within the axle way 45.

The foremast assembly 50 includes a foremast body 52, which according to the present invention selectively engages the locking gear 80 to perform a braking operation according to the present invention. Accordingly, the foremast body 52 has a foremast tooth 54 which is sized to fit between the gear teeth 84. The assembly 50 includes a foremast guide 56, which has a tube 58 and a foremast flange 60. The foremast body 52 is vertically slidably mounted within the tube 58.

The foremast body 52 has a vertical limiter slot 62. The tube 58 has a tube side bore 64 for accepting a limiter pin 66. The limiter pin 66 extends through the tube side bore 64 and extends through the vertical limiter slot 62, thus defining a range of vertical motion for the foremast body 52. The limiter pin 66 has a pair of limiter pin ends 68, each having a limiter pin end groove 70. A spring clip 72 is placed in each of the limiter pin end grooves to hold the limiter pin 66 in place.

A manual release 90 includes a release peg 91 and a release rod 92, which has two threaded ends 94. One of the threaded ends secures to the foremast body 52, and the other threaded end 94 secures to the manual release peg 91. The manual release peg 91 has a slot 96, for accepting a manual release lever 98. A manual release spring 99 biases the foremast body 52 upward, toward a non-release position. The manual release lever 98 is selectively operable to pull the foremast body 52 downward, overcoming force from the manual release spring 99 to disengage the foremast body 52 from the locking gear 80.

Figure 2:
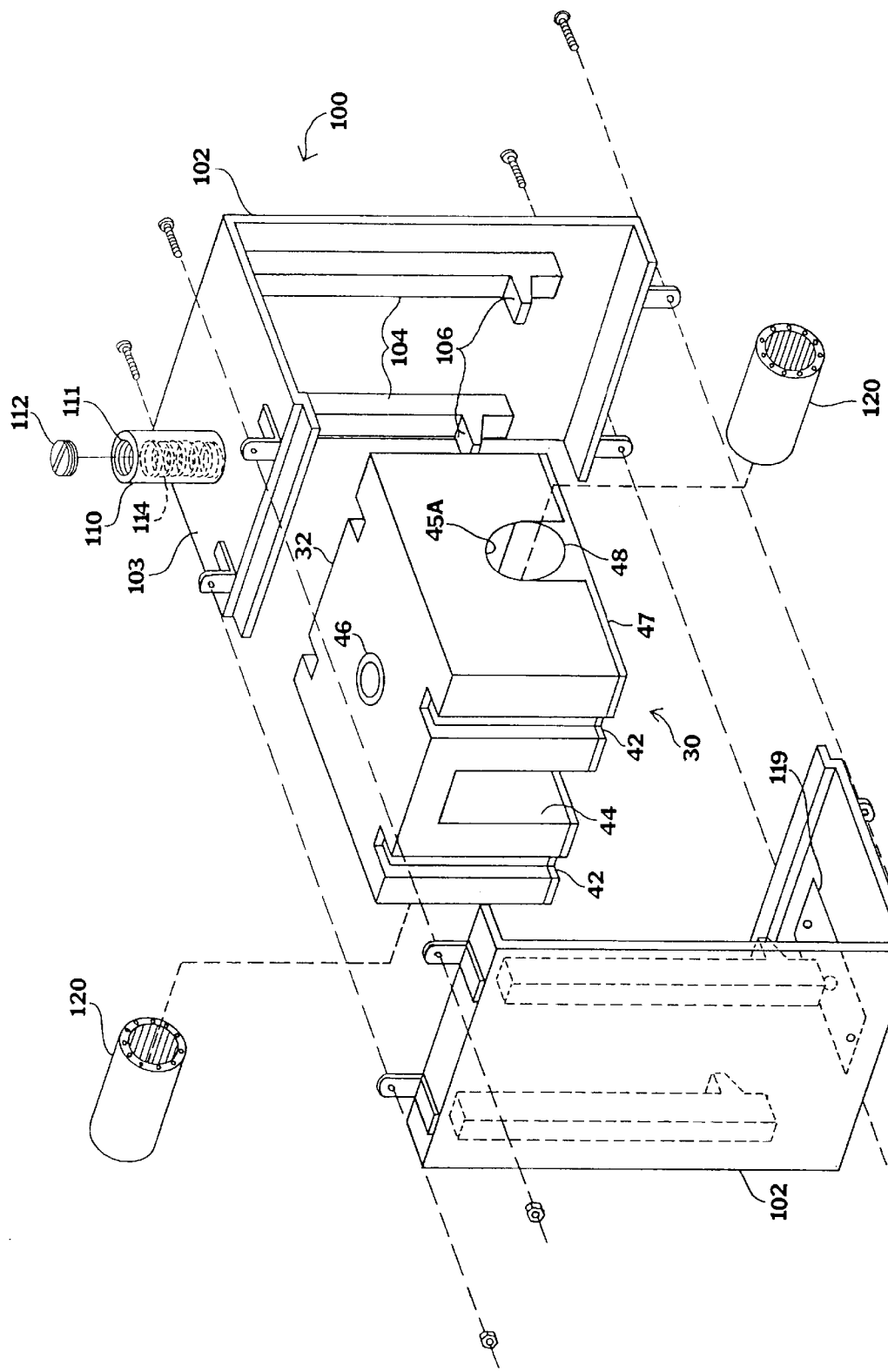
FIG. 2 is an assembly view, illustrating mounting of the block assembly within the housing, and installation of the axle bearings into the bridges.

FIG. 2 illustrates a housing 100, and installation of the block assembly 30 within the housing 100. The housing 100 comprises two housing halves 102, and a housing top 103. The housing halves 102 each have a pair of vertical guide rails 104 which mate with the vertical grooves 42 in the block 32. Each vertical guide rail 104 has a bottom stop 106 for holding the block assembly 30 between the bottom stop 106 and housing top 103.

The housing 100 has a main spring tube 110 on the housing top 103 which extends therethrough. The main spring tube 110 is open opposite the housing top 103. The main spring tube has an internal thread 111, and a main spring set screw 112 which threads into the main spring tube 110. A main spring 114 extends within the main spring tube 110, and rests against the spring seat 46 on the block top. The main spring 114 is thus tensioned between the main spring set screw 112 and the spring seat 46 of the block 32 according to a distance that the main spring set screw 112 is threaded into the main spring tube 110.

The housing 100 is fixed to the frame of a wheelchair. The block assembly 30 is attached to wheels of the wheelchair in a manner that will be described hereinafter. Thus, the entire weight of the wheelchair rests upon the main spring 114. The block assembly 30 moves with respect to the housing 100 according to the weight of the wheelchair and its passenger, according to the main spring 114 chosen, and according to the setting of the main spring set screw 112. This relationship is crucial to the functioning of the invention, as will be apparent shortly hereafter.

Also apparent in FIG. 2 is the cylindrical passageway created between the semicircular bearing support 48 of the bridge 47 and the arcuate top 45A. A pair of needle bearings 120 are mounted in each of the semicircular bearing supports 48 in the manner illustrated.

Also seen in FIG. 2 is a foremast guide mounting position 119 where the foremast guide is mounted. Holes are provided for mounting the foremast guide flange 60, and for allowing passage of the release rod 92, all seen in FIG. 1. Mounting screws and nuts are present in FIG. 1 and FIG. 2 to help illustrate how the various components of the invention are assembled. It is important to note that the mounting screws and nuts shown for mounting the foremast guide flange 60 in FIG. 1 is used for mounting the foremast guide flange 60 to the housing 100 at the foremast guide mounting position 119 shown in FIG. 2. Once the housing is fully assembled in the manner illustrated in FIG. 2, the foremast assembly 50 of FIG. 1 is brought into contact with the locking gear through the gear cavity 44.

Figure 3:
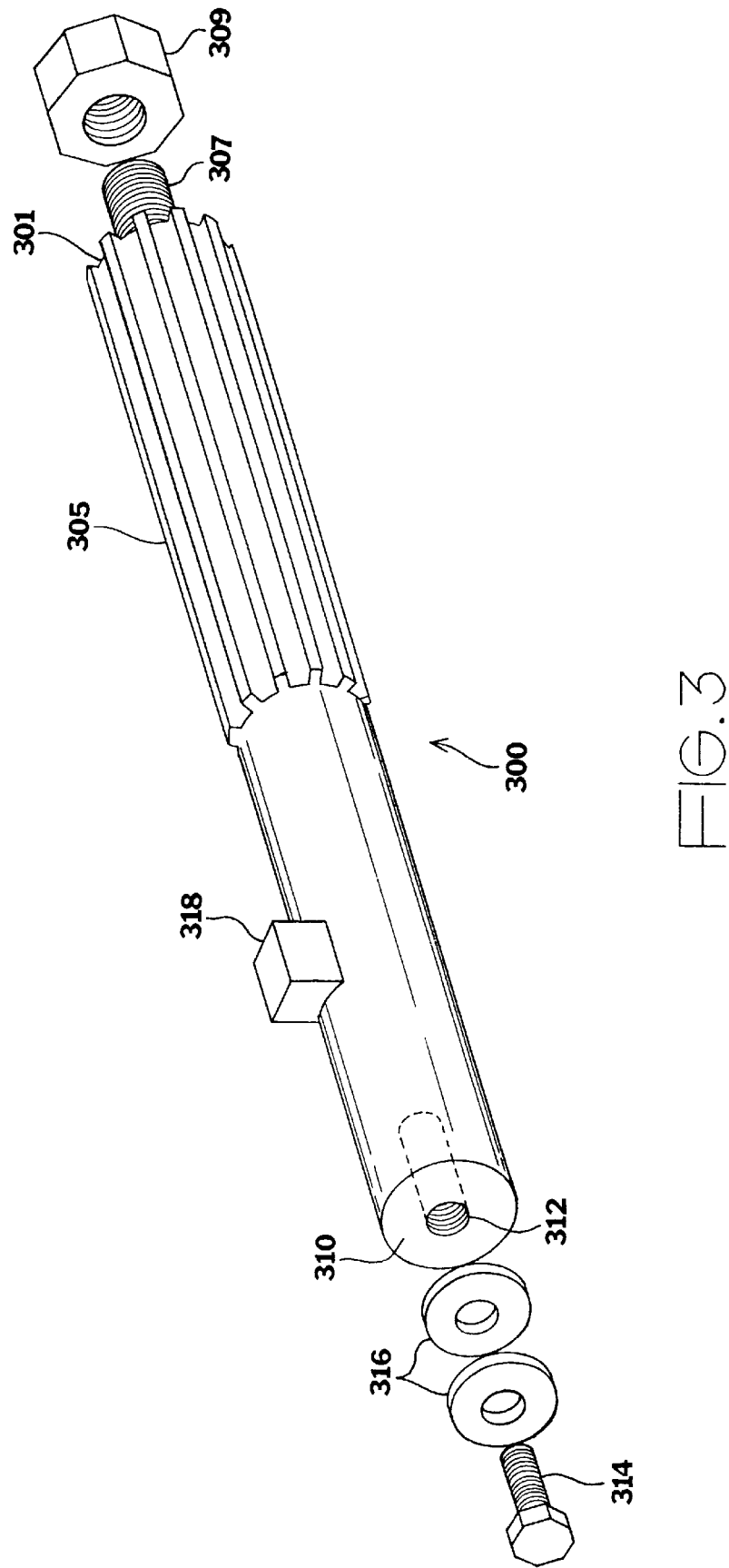
FIG. 3 is a diagrammatic perspective view, illustrating the axle assembly.

FIG. 3 illustrates an axle assembly 300 according to the present invention. The axle assembly 300 has a first end. A splined section 305 extends from the first end 301. A first end thread 307 is provided at the first end 301, along with a mating nut 309.

The axle assembly 300 has a second end 310 opposite the first end 301. The second end 310 has a threaded orifice 312 and a bolt 314 which is secured in the threaded orifice 312 with the aid of washers 316 to prevent lateral movement of the axle 300. Referring back to FIG. 2, the second end of the axle assembly extends through the bearings 120, and is secured thereto with the bolt 314 and washers 316.

Figure 5:
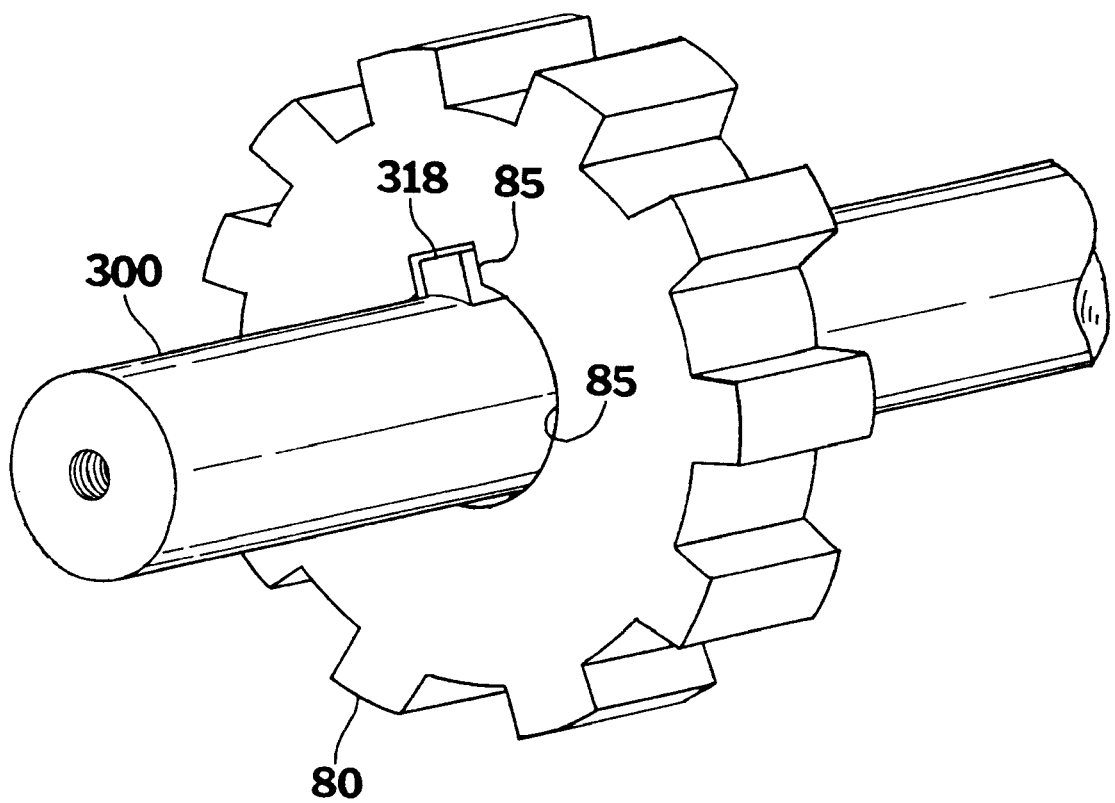
FIG. 5 is a diagrammatic perspective view, illustrating attachment of the locking gear onto the axle, the gear fixed to the axle with a key.

The axle has a key 318 near the second end 310 which is used to secure the locking gear 80. Referring briefly to FIG. 5, the locking gear 80 has a keyway 85 in the shaftway 83. The axle 300 extends through the shaftway 83 and the key 318 extends into the keyway, fixing the axle and locking gear 80, so that they rotate and stop rotating together. Many different types of keys may be used to lock the gear in place as would be appreciated by those skilled in the art.

Figure 4:
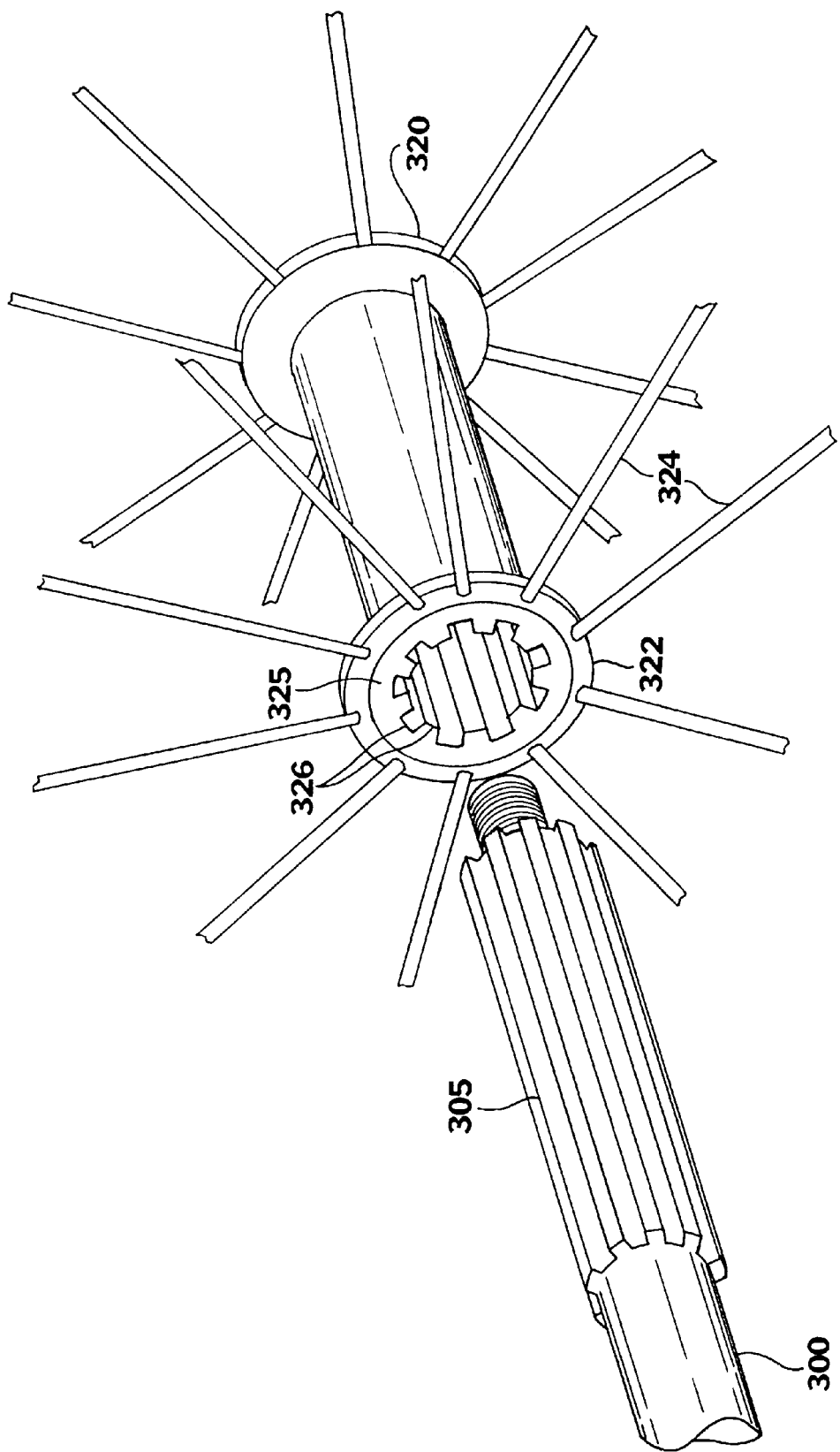
FIG. 4 is a diagrammatic perspective view, illustrating attachment of one of the wheels onto the splined portion of the axle.

Referring now to FIG. 4, a wheel 320 is being secured onto the axle 300. The wheel 320 has a hub 322 having a plurality of spokes 324 extending radially outward therefrom. The wheel has an inner hub 325 which has a splined interior 326 which mates with the splined section 305 of the axle 300. The hub 322 and the splined section 305 lock into place, fixing the rotational position of the wheel 320 and the axle 300. Referring momentarily back to FIG. 3, once the wheel 320 is installed onto the splined section 305, the mating nut 309 is attached onto the first threaded end 307 to secure to the wheel 320 into place.

Thus, now with reference to FIG. 3, FIG. 4, and FIG. 5 the locking gear 80, the axle 300 and the wheel 320 are fixed so that all three rotate together. Thus, stopping the locking gear 80 will stop the wheel 300 dead. This is crucial to the present invention, which locks the wheels by stopping the locking gear 80.

In general, the system described above is duplicated in an ordinary wheelchair installation, so that actually two braking systems are present—one for each of the two wheelchair wheels. Of course, it is possible to provide some degree of protection to the passenger by only providing one braking system, and thus only braking one of the wheels. That embodiment is not preferably, but is contemplated as being part of the inventive concept.

The manner in which the locking gear 80 is stopped will now be described. Reference is made casually to all drawing figures hereinafter. Reference numeral designations are maintained throughout the following discussion for clarity, although one might need to view different drawings simultaneously to understand an interaction of components as it is being described.

As previously described, the locking gear 80 is maintained in the gear cavity 44, and the axle 300 is normally allowed to rotate freely in the bearings, as supported by the bridges 47. However, the gear 80 can be stopped quickly by bringing the foremast body into contact with the gear 80, by interrupting the gear teeth with the foremast tooth.

Once again, the housing 100 is rigidly attached to the wheelchair frame. Further, the wheel is supported fully by the block. The position of the block 32 within the housing 100 is dependent on the weight of the wheelchair and its passenger, and tension that the main spring 114 exerts against the block 32. Thus, when the weight of the wheelchair is greatly reduced, such as when the passenger is not present in the wheelchair, then the main spring 114 expands, forcing the block 32 downward with respect to the housing 100. (In actuality, the position of the block 32 with respect to a ground surface beneath the wheels is fixed, so the housing 100 actually moves upward with respect to the ground surface). When the block 32 is forced downward, the locking gear 80 is moved toward the foremast assembly 50. If the block 32 is moved downward far enough, then the foremast tooth 54 of the foremast body will engage the gear teeth 84 of the locking gear 80, and effectively brake the wheel.

Further, when a passenger sits down in the wheelchair, the housing 100 is pushed downward, raising the block 32 with respect to the housing 100. Once the block 32 is raised sufficiently, the locking gear 80 is freed from the foremast body 54, and the locking gear 80 and thus the wheel is allowed to rotate. Adjustment of the main spring tension with the main spring set screw 112 is crucial for determining the amount of weight that the passenger must place upon the wheelchair in order to free to the locking gear 80. This adjustment is made to ensure that the foremast body 54 engages the locking gear to brake the wheels when the passenger is beginning to leave or is just entering the wheelchair, and that the locking gear 80 is free to rotate when the passenger is fully seated in the wheelchair.

The manual release 90 operates to free the locking gear 80 from the foremast 54, even when insufficient weight is present on the wheelchair, and thus the block 32 is positioned low in the housing 100. The manual release 90 operates by actually pulling the foremast body 54 downward to free said foremast body 54 from the locking gear 80. The manual release lever 98 extends rearward from the housing, so that a person standing behind the wheelchair can operate the manual release to unlock the braking system.

In conclusion, herein is presented a wheelchair braking system which operates in response to weight present upon the wheelchair to selectively lock the wheels when insufficient weight is present on the wheelchair because the passenger is in the process of standing up from or sitting down in the wheelchair. A manual release is provided to unlock the wheels by a person standing behind the wheelchair, even if insufficient weight is present on the wheelchair.

What is claimed is:

1. A braking system, for mounting to a wheelchair having a wheelchair frame and a pair of wheels, for stopping motion of the wheels when a passenger is not fully seated in the wheelchair, the braking system comprising:

a housing, the housing adapted to be rigidly attached to the frame;

an axle assembly, the axle assembly attached to one of the wheels;

a block assembly located within the housing, comprising a block, the block assembly having a cylindrical passageway for supporting the axle, the axle rotatably mounted within the block assembly, the block capable of controlled relative vertical motion with respect to the housing;

a locking gear, fixed to the axle assembly;

a main spring between the block and the housing, the spring biased between the housing and the block, the spring moving the block down within the housing when a passenger is absent from the wheelchair, said spring contracting when the passenger is fully seated in the wheelchair, allowing the block to move upward within the housing; and a foremast assembly, mounted to the housing, the foremast assembly including a foremast body which is selectively brought into engagement with the locking gear when the block is low within the housing to stop the locking gear, and thus stop the wheels when the passenger is not exerting sufficient weight upon the wheelchair when the passenger is in the process of standing up or sitting down, when the passenger is fully seated in the wheelchair, the upward movement of the block frees the foremast body from the gear and allows the gear and the wheels to rotate.

2. The wheelchair braking system as recited in claim 1, wherein the locking gear further comprises a plurality of gear teeth, and wherein the foremast body has a foremast tooth which selectively is interjected between the gear teeth to stop the gear from rotating.

3. The wheelchair braking system as recited in claim 2, wherein the block further has vertical grooves, and wherein the housing has vertical rails which mate with the vertical grooves to control vertical motion of the block within the housing.

4. The wheelchair braking system as recited in claim 3, wherein the block assembly further comprises:

a block top, a block bottom, and block sides;

a pair of bridges, each bridge having a bridge flange and a semicircular bearing support;

an axle way, the axle way extending between the block sides upward from the block bottom, the axle way having an arcuate top; and wherein the bridges are mounted to the block bottom to form the cylindrical passageway for the axle between the semicircular bearing supports and the arcuate top of the axle way.

5. The wheelchair braking system as recited in claim 4, wherein the block top has a spring seat, the housing has a main spring tube, and wherein the main spring is located between the spring seat and the main spring tube.

6. The wheelchair braking system as recited in claim 5, wherein the foremast body has a vertical limiter slot and the foremast assembly further comprises:

a foremast guide having a foremast tube and a foremast flange, the foremast flange fixed to the housing, the foremast body vertically slidably mounted within the foremast tube, the foremast tube has a tube side bore; and a limiter pin extending through the tube side bore and through the vertical limiter slot, defining a range of vertical motion for the foremast body.

7. The wheelchair braking system as recited in claim 6, wherein the limiter pin further has a pair of limiter pin ends, each having a limiter pin end groove, and further comprising a spring clip placed in each of the limiter pin grooves to hold the limiter pin in place.

8. The wheelchair braking system as recited in claim 7, further comprising a manual release, having a manual release lever, for allowing a person standing behind the wheelchair to selectively free the foremast from the locking gear by operating the manual release lever.

9. The wheelchair braking system as recited in claim 8, wherein the manual release further comprises:

a manual release peg having a slot for accepting the manual release lever; and a release rod having two threaded ends, one of the threaded ends secured to the foremast body, the other threaded end secured to the manual release peg; and a manual release spring which biases the foremast body upward toward a non-release position unless actuated by the manual release lever.

10. The wheelchair braking system as recited in claim 9, further comprising a pair of bearings, mounted in the semicircular bearing supports, for accepting the axle and allowing low friction rotation between the axle and the semicircular bearing supports.

11. The wheelchair braking system as recited in claim 10, wherein the axle has a splined section, and wherein the wheel has a wheel hub having a splined interior, the splined interior mating with the splined section for fixing the wheel to the axle.

12. The wheelchair braking system as recited in claim 6, further comprising a manual release, having a manual release lever, for allowing a person standing behind the wheelchair to selectively free the foremast from the locking gear by operating the manual release lever.

13. The wheelchair braking system as recited in claim 12, wherein the manual release further comprises:

a manual release peg having a slot for accepting the manual release lever; and a release rod having two threaded ends, one of the threaded ends secured to the foremast body, the other threaded end secured to the manual release peg; and a manual release spring which biases the foremast body upward toward a non-release position unless actuated by the manual release lever.

14. The wheelchair braking system as recited in claim 13, wherein the system as described is duplicated, so that one such braking system is associated with each of the two wheels of the wheelchair.

* * * * *